(12) United States Patent
Bigley et al.

(10) Patent No.: US 8,769,590 B2
(45) Date of Patent: Jul. 1, 2014

(54) SYSTEM AND METHOD FOR ACCESSING ENTERTAINMENT MEDIA

(76) Inventors: Scott A. Bigley, Berwyn Heights, MD (US); Thomas J. Debosky, Huntingtown, MD (US)

(*) Notice: Subject to any disclaimer, the term of this patent is extended or adjusted under 35 U.S.C. 154(b) by 995 days.

(21) Appl. No.: 11/821,925

(22) Filed: Jun. 26, 2007

(65) Prior Publication Data

US 2008/0127282 A1 May 29, 2008

Related U.S. Application Data

(60) Provisional application No. 60/816,763, filed on Jun. 26, 2006.

(51) Int. Cl.
*H04N 7/173* (2011.01)

(52) U.S. Cl.
USPC .............................. 725/87; 725/88; 725/89

(58) Field of Classification Search
USPC ..................................... 725/87–89
See application file for complete search history.

(56) References Cited

U.S. PATENT DOCUMENTS

| | | | |
|---|---|---|---|
| 5,181,107 A | 1/1993 | Rhoades | |
| 5,914,941 A | 6/1999 | Janky | |
| 6,507,727 B1 | 1/2003 | Henrick | |
| 7,010,801 B1 | 3/2006 | Jerding et al. | |
| 2004/0133914 A1* | 7/2004 | Smith et al. | 725/86 |
| 2005/0198677 A1* | 9/2005 | Lewis | 725/87 |
| 2007/0124779 A1* | 5/2007 | Casey et al. | 725/87 |
| 2008/0092181 A1* | 4/2008 | Britt | 725/87 |

* cited by examiner

*Primary Examiner* — Pankaj Kumar
*Assistant Examiner* — Charles N Hicks
(74) *Attorney, Agent, or Firm* — James Ray & Assoc

(57) ABSTRACT

A system and method for storage, management, transmission, and control of digital entertainment media includes a central remote server device and a plurality of individual user digital receivers. The method includes steps for licensing multiple forms of entertainment units for storage on the central remote server device, then receiving individual orders for an entertainment unit electronically from individuals possessing any one of an assortment of digital receivers. The payment for an individual order is verified, then the nature of the user's digital receiver is identified. As needed, decryption code and subsequently the encrypted entertainment unit are transmitted to the individual's digital receiver. Payment to licensor of the entertainment unit is submitted based on agreed-upon terms.

7 Claims, 4 Drawing Sheets

SYSTEM AND METHOD FOR ACCESSING ENTERTAINMENT MEDIA

CROSS REFERENCE TO RELATED APPLICATION

This patent application is related to and claims priority from U.S. Provisional Patent Application Ser. No. 60/816,763 filed Jun. 26, 2006.

FIELD OF THE INVENTION

The present invention relates, in general, to systems and methods for accessing entertainment media and, more particularly, this invention relates to a system and method of remote access of previously purchased or licensed media.

BACKGROUND OF THE INVENTION

Prior to the conception and development of the present invention, VHS tapes and subsequently DVD's allowed consumers a way to legally purchase and own video content for playback when desired. Later, pay-per-view and on-demand services allowed users one-time access to video content at their convenience. Digital video recorders provide a means to record and store video and music content on either disks or hard drives. The Blu-ray disc format was developed to provide for high definition video recording, rewriting, and playback, along with the high capacity memory needed for the high definition. In this rapidly changing field of technology, it is difficult to predict what will be in fashion next.

Others have previously disclosed systems and methods for delivery of digital entertainment content. U.S. Pat. No. 5,181,107 discloses a remote information storage system with a plurality of remote subscribers linked by telephone lines and home computers. U.S. Pat. No. 5,914,941 discloses an audio information storage and playback apparatus focusing on subscription and on-demand audio programming.

U.S. Pat. No. 6,507,727 discloses a system for delivering digital content from a central server ordered by the user via any one of a number of communication devices, but there is no mention of long-term storage of user's previously purchased and uploaded content. U.S. Pat. No. 7,010,801 discloses a method for an interactive media services system to provide media to multiple users through a number of rental options. Once again, long-term storage of previously purchased and non-copyrighted material is not a part of this system.

SUMMARY OF THE INVENTION

A system and method for storage, management, transmission, and control of digital entertainment media includes a central remote server device and a plurality of individual user digital receivers. The method includes steps for licensing multiple forms of entertainment units for storage on the central remote server device, then receiving individual orders for an entertainment unit electronically from individuals possessing any one of an assortment of digital receivers. The payment for an individual order is verified, then the nature of the user's digital receiver is identified. As needed, decryption code and subsequently the encrypted entertainment unit are transmitted to the individual's digital receiver. Payment to licensor of the entertainment unit is submitted based on agreed-upon terms.

In an alternative embodiment, the remote server device is electronically linked to individual personal account files which handle the primarily financial and administrative aspects of the method.

OBJECTS OF THE INVENTION

It is, therefore, one of the primary objects of the present invention to provide consumers of the various digital entertainment forms a central source to access the media by a variety of means.

Another object of the present invention is to provide those marketing their form of entertainment a simple route for digitally transmitting their product to consumers without the need for making, packaging, storing, and shipping actual pieces.

Still another object of the present invention is to provide consumers with a way to access entertainment media they have purchased or licensed without committing their own digital storage devices.

Yet another object of the present invention is to provide entertainment consumers a way to access previously-purchased media in the latest format.

An additional object of the present invention is to provide participants with one central storage location for all of their previously acquired as well as newly acquired entertainment content.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
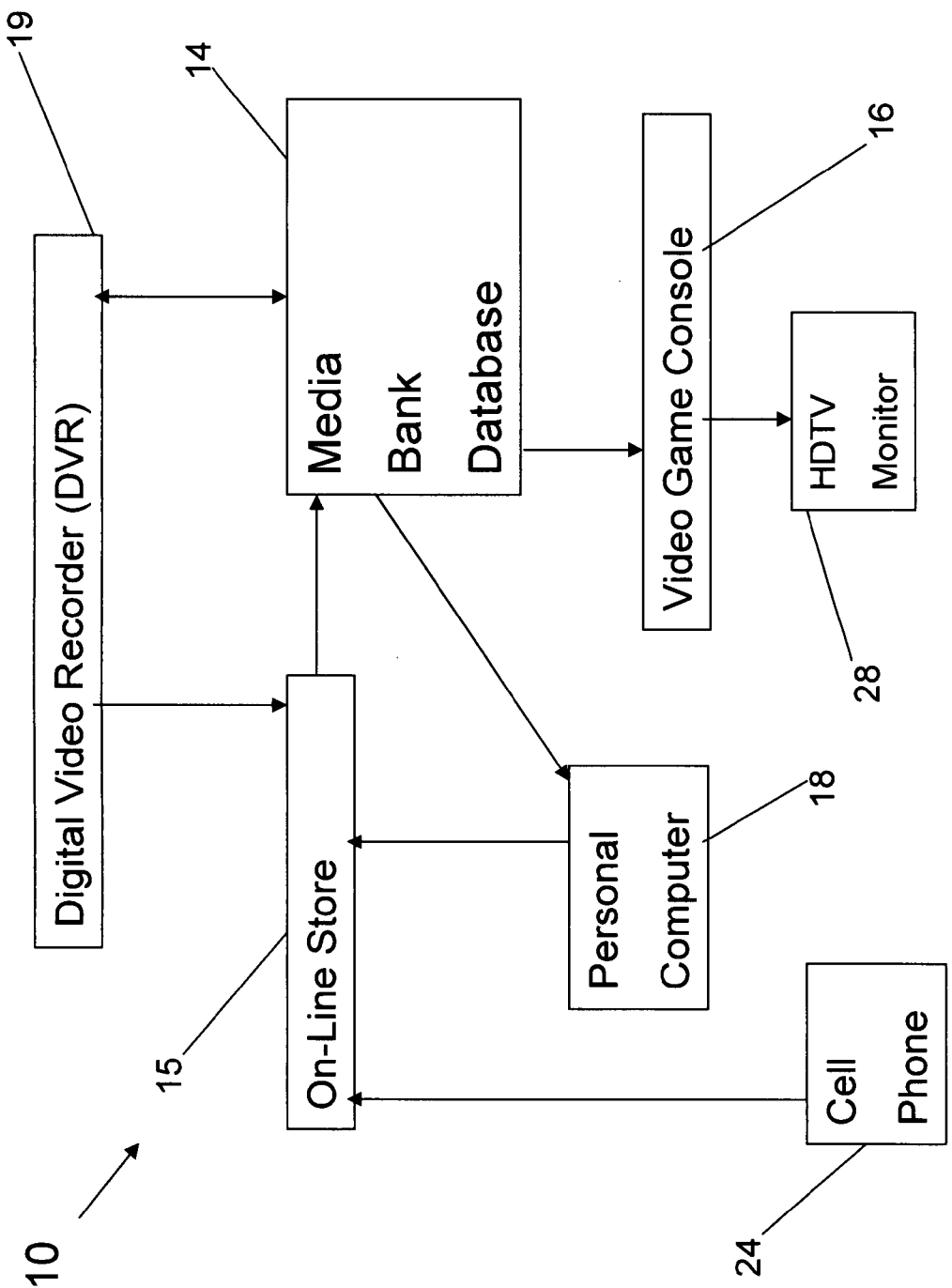
FIG. 1 is block diagram of a preferred embodiment entertainment delivery system.

DETAILED DESCRIPTION OF A PRESENTLY PREFERRED AND AN ALTERNATIVE EMBODIMENT OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Referring initially to FIG. 1, the system 10 is diagrammed in a block flow schematic. After mentally selecting the desired piece of entertainment available by digital transmission, the customer communicates with the appropriate online store 15 from any of a variety of devices, such as a personal computer (PC) 18, a digital video recorder (DVR) 19, or cell phone 24. One on-line store example would be Apple's iTunes®. Along with payment, the customer requests that the online store digitally transmit the selected entertainment to his account at the remote media bank database 14. This can be done securely by various means, one of which is described in U.S. Pat. No. 6,055,314 and incorporated herein by reference. The media bank server can optionally determine if that content already resides on the server, and saving multiple copies may not be necessary.

When the customer subsequently decides they want to access their purchased entertainment, they can do so from the appropriate or desired device, such as the DVR 19, a PC 18 via the Internet, or a video game console 16, just to name a few. The video game console 16 would be linked to a TV monitor 28 for viewing. Typically, the entertainment would also be available to the customer anytime without the need for the customer to store it on their own device.

Figure 2:
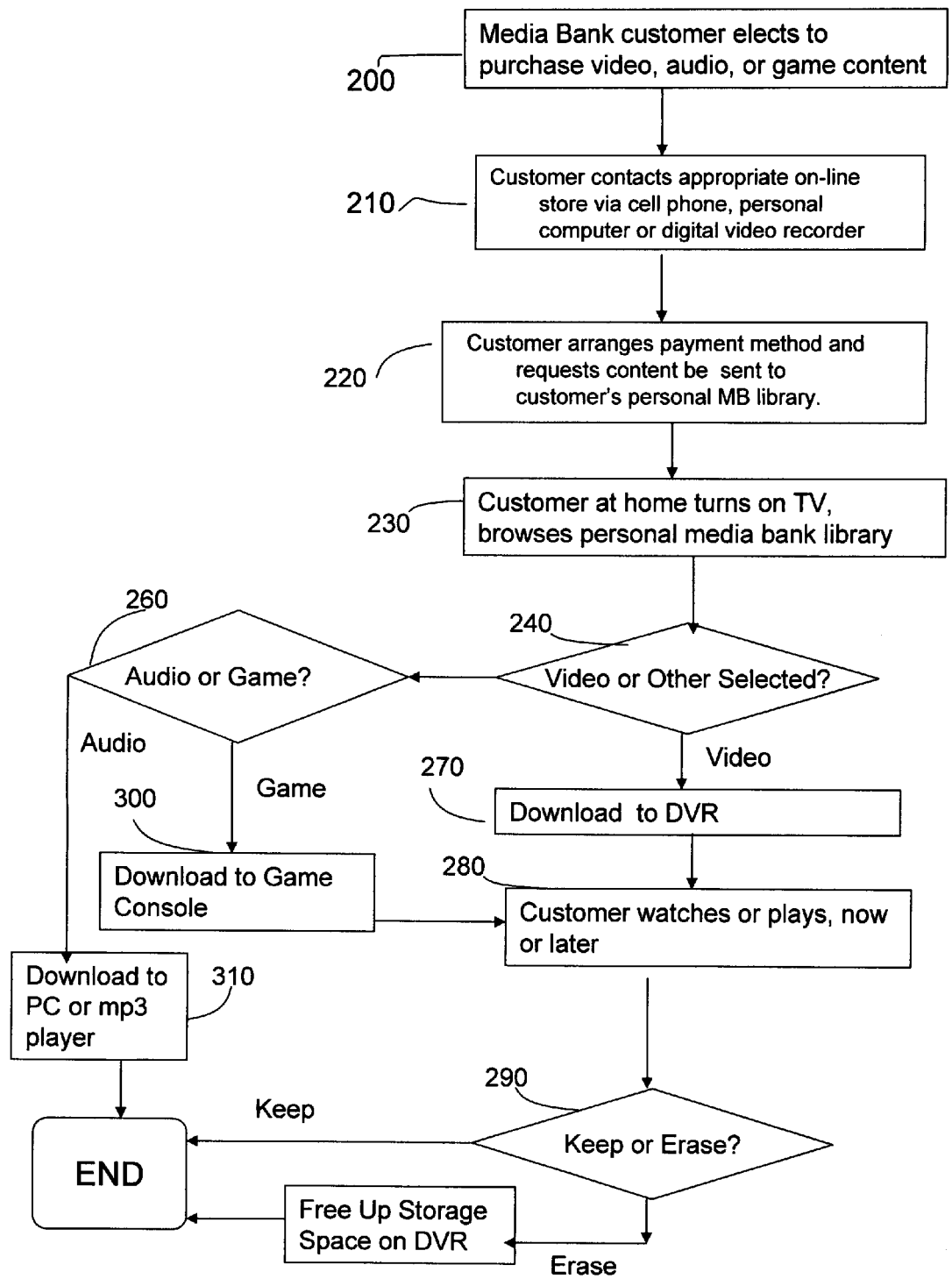
FIG. 2 is a flowchart of a method for acquiring digitally transmitted entertainment media according to the present invention.

FIG. 2 provides a flowchart describing a method of using the system illustrated in FIG. 1. Beginning with step 200, a customer of the media bank system mentally decides that they want to purchase a certain unit of entertainment, be it a movie, music, or a video game, just to mention a few. In step 210, the customer contacts the appropriate on-line vendor via the most convenient means at the time, such as a cell phone, a PC via the Internet, or a television set-top box via cable or satellite TV. In the course of this communication, at step 220, the customer arranges a suitable payment method and nearly simultaneously requests that the content be made available via the customer's personal media bank library. When the customer arrives home or at another viewing location as indicated at step 230, they turn on the TV set and browse their personal media bank. As shown at decision diamonds, 240 and 260, the selection of what type of entertainment is made. If it is video, such as a movie, then step 270 of downloading to a digital video recorder (DVR) takes place. As indicated in step 280, the consumer has the option to begin watching then or later. Subsequently, at step 290, the customer can decide to keep the content stored on their own device, or erase it. Erasing it would free up some of their personal digital storage capacity. If it is a video game or audio, such as music, the transfer is made to the appropriate device, steps 300 and 310. Game players would not need to store or look through large stacks of game cartridges to find the one they want to play.

Figure 3:
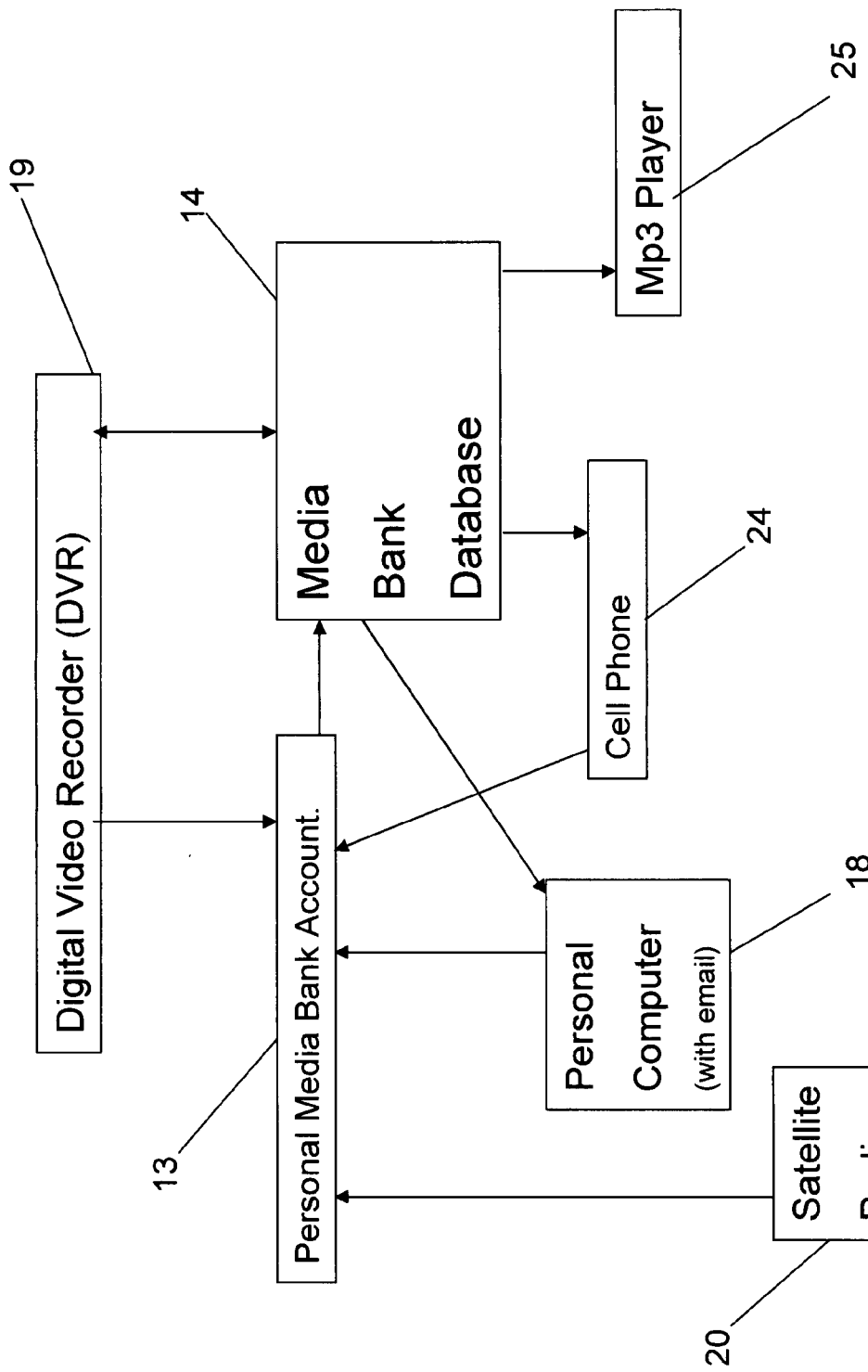
FIG. 3 is a block diagram of an alternative system for acquisition of digitally-transmitted entertainment.

FIG. 3 depicts an alternative embodiment of the system described in FIG. 1. In this version, the customer communicates with their personal media bank account 13, which is linked with the media bank database 14. The online store that was part of FIG. 1 is bypassed in this embodiment. The communication can be from a variety of sources including, but not limited to, a satellite radio 20, a PC 18, or a cell phone 24. The customer can also upload digital media, such as home videos, to the media bank 14 via their personal media bank account 13. Optionally, a decryption code may be sent to the customer's digital video recorder (DVR) 19 or PC 18. As needed, the customer's account is billed or a subscription is verified, and a transaction record is emailed to the customer's PC 18. Nearly simultaneously, the customer is granted access to the ordered entertainment through their personal library to the media bank database 14. Depending on the type of entertainment, it can be accessed by a DVR 19, PC 18, cell phone 24, an mp3 player 25, or other current or future technologies.

Figure 4:
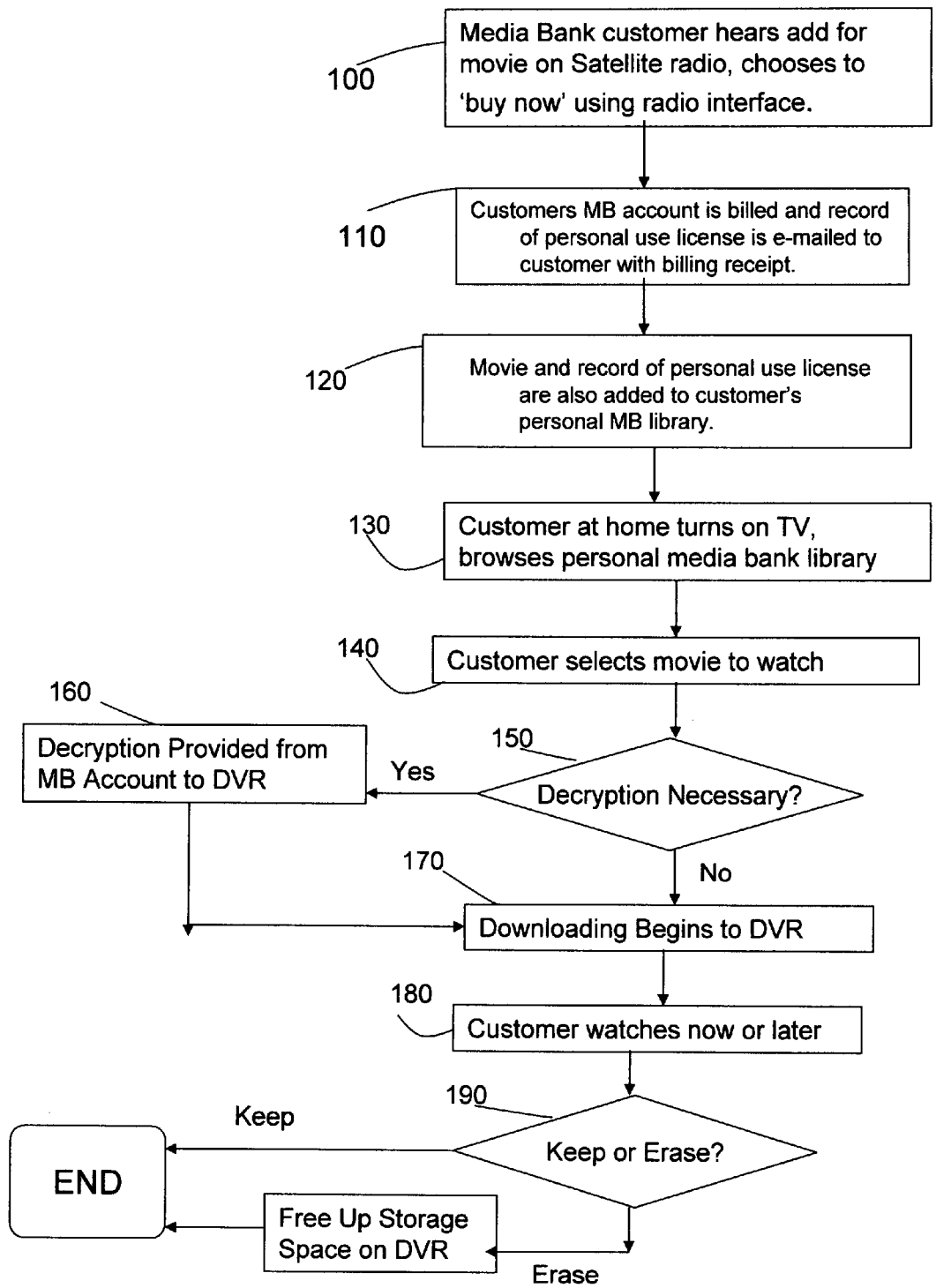
FIG. 4 is a flowchart of an alternative method for acquiring entertainment according to the present invention.

FIG. 4 provides a flowchart describing a method of using the system of FIG. 3 to purchase and access a movie. While not shown, other forms of entertainment would work in a similar fashion. Starting with step 100, the media bank customer, in response to an advertisement, review, or word of mouth, elects to purchase a certain movie now. For this example, a satellite radio interface is used to place the order. At step 110, the customer's media bank account is billed and a record of this is emailed to the customer. A personal-use license is added to the individual's account and access to the movie at the media bank server is granted at step 120. In step 130, the customer arriving at home browses their media bank library. He or she then selects the desired movie at step 140. The decision diamond at step 150 automatically addresses the issue of whether or not decryption is needed, and if it is, the necessary code is transmitted to the DVR, step 160. At step 170 then, the downloading begins. In step 180, the customer can begin watching even while the downloading is ongoing, or they can watch later. Sometime later, as step 190 indicates, they can decide whether to keep the movie stored on their own resources, or free up storage space by erasing it.

While a presently preferred and alternative embodiment of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

We claim:

1. A system for storage, management, and remote access of digital entertainment content consisting of:
   a) at least one individual digital transmission device possessed by at least two persons;
   b) one of a subscription and a pay-on-demand service configured to:
     (i) receive, identify and interpret signals from said at least one individual digital transmission device, said signals identifying content transmission request;
     ii) determine registration and account status of said at least one individual transmission device;
     (iii) distinguish type of entertainment request from said at least one individual transmission device;
     (iv) receive payment by way of said at least one individual digital transmission device;
     (v) establish a personal-use license and add license to the individual's account; and
     (vi) grant an access to a purchased entertainment content; and
   c) at least one remote media services server device in communication with and responsive to said one of subscription and pay-on-demand service, wherein said at least one remote media server device is adapted to:
     (i) receive said purchased entertainment content from said one of said subscription and pay-on-demand service;
     (ii) store said purchased entertainment content; and
     (iii) transmit said purchased entertainment content directly to said at least one individual digital transmission device.

2. The system, according to claim 1, wherein said entertainment content is one of music, movies, television shows, audio recordings, and video games.

3. The system, according to claim 1, wherein said individual transmission device is one of a personal computer, satellite TV set top box, cable TV set top box, mobile phone, and personal digital assistant (PDA).

4. The system, according to claim 1, wherein said at least one individual digital transmission device is a plurality of digital transmission devices.

5. The system, according to claim 4, wherein said plurality of devices is at least two from the group of mobile phone, personal computer, satellite TV set top box, cable TV set top box, satellite radio, and personal digital assistant (PDA).

6. A system for storage, management, and remote access of digital entertainment content comprising:

a) at least one individual digital transmission device;
b) one of a subscription and pay-on-demand computer-based service configured to receive a payment and an entertainment content transmission request from a customer by way of said at least one individual digital transmission device, establish a personal-use license and add license to the individual's account and grant an access to a purchased entertainment content; and
c) a remote media database server in communication with and responsive to said one of subscription and pay-on-demand computer-based service, wherein said media database server is configured to receive purchased entertainment content from said one of said subscription and pay-on-demand service, store said purchased entertainment content and transmit said purchased entertainment content directly to directly to said at least one individual digital transmission device.

7. The system of claim 6, wherein said one of said subscription and pay-on-demand computer-based service is further configured to:
a) determine registration and account status of each of said at least one individual digital transmission device;
b) distinguish type of said entertainment content request from said at least one individual digital transmission device;
c) determine availability and cost of said entertainment request;
d) verify payment status for said entertainment content request; and
e) determine a receiving device for said entertainment content request.

\* \* \* \* \*